(12) United States Patent
Edry

(10) Patent No.: US 12,556,574 B2
(45) Date of Patent: Feb. 17, 2026

(54) USING CROSS WORKLOADS SIGNALS TO REMEDIATE PASSWORD SPRAYING ATTACKS

(71) Applicant: Microsoft Technology Licensing, LLC, Redmond, WA (US)

(72) Inventor: Dor Edry, Modi'in-Maccabim-Reut (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 319 days.

(21) Appl. No.: 18/171,453

(22) Filed: Feb. 20, 2023

(65) Prior Publication Data

US 2024/0283818 A1     Aug. 22, 2024

(51) Int. Cl.
  *H04L 9/40* (2022.01)

(52) U.S. Cl.
  CPC ...... *H04L 63/1466* (2013.01); *H04L 63/1416* (2013.01); *H04L 63/20* (2013.01)

(58) Field of Classification Search
  CPC .. H04L 63/1466; H04L 63/1416; H04L 63/20
  USPC ........................................................ 726/22
  See application file for complete search history.

(56) References Cited

U.S. PATENT DOCUMENTS

| | | | | |
|---|---|---|---|---|
| 8,388,441 B2 * | 3/2013 | Shin | ...................... | A63F 13/352 705/51 |
| 8,966,036 B1 * | 2/2015 | Asgekar | .................. | H04W 4/08 707/706 |
| 10,931,686 B1 | 2/2021 | Mehta et al. | | |
| 11,184,392 B2 * | 11/2021 | Thomas | .............. | H04L 63/0236 |
| 2006/0174324 A1 * | 8/2006 | Zur | ..................... | H04L 63/1416 726/3 |
| 2008/0313370 A1 * | 12/2008 | Kang | ..................... | G06F 21/85 710/67 |
| 2010/0107257 A1 * | 4/2010 | Ollmann | ............... | G06F 21/566 707/E17.014 |
| 2014/0143825 A1 * | 5/2014 | Behrendt | ............. | G06F 21/552 726/1 |
| 2015/0310196 A1 * | 10/2015 | Turgeman | ............. | H04W 12/06 726/19 |
| 2018/0091530 A1 * | 3/2018 | Rook | .................. | H04L 63/1416 |
| 2019/0306168 A1 * | 10/2019 | Raman | ................ | H04L 63/1466 |
| 2020/0304524 A1 * | 9/2020 | Weinberger | ......... | H04L 63/1425 |

(Continued)

FOREIGN PATENT DOCUMENTS

CN         114465816 A     5/2022

OTHER PUBLICATIONS

Zekri, et al., "DDoS attack detection using machine learning techniques in cloud computing environments", In Proceedings of 3rd International Conference of Cloud Computing Technologies and Applications, Oct. 24, 2017, 8 Pages.

(Continued)

*Primary Examiner* — Kaylee J Huang
(74) *Attorney, Agent, or Firm* — Workman Nydegger

(57) ABSTRACT

A method for detecting password spray attacks. The method includes obtaining information from an on-machine malware detection application for a particular machine indicating that a password spray tool is detected on the particular machine. Information is obtained indicating that the particular machine has performed failed sign in attempts. As a result, a determination is made that the particular machine is performing password spray attacks.

20 Claims, 6 Drawing Sheets

(56) References Cited

U.S. PATENT DOCUMENTS

2021/0243207 A1\* 8/2021 Crume ................ G06F 16/2255
2021/0288981 A1   9/2021 Numainville et al.
2022/0182397 A1   6/2022 Romero Zambrano et al.

OTHER PUBLICATIONS

International Search Report and Written Opinion received for PCT Application No. PCT/US24/014918, Apr. 25, 2024, 14 pages.
International Preliminary Report on Patentability received for PCT Application No. PCT/US24/014918, Sep. 4, 2025, 09 pages.

\* cited by examiner

600

Obtaining Information From An On-machine Malware Detection Application For A Particular Machine Indicating That A Password Spray Tool Is Detected On The Particular Machine — 610

Receiving Information That The Particular Machine Has Performed Failed Sign-on Attempts — 620

Determining That The Particular Machine Is Performing Password Spray Attacksby Identifying That A Password Spray Tool Is Detected On The Particular Machine And Identifying That The Particular Machine Has Performed Failed Sign In Attempts — 630

*Figure 6*

USING CROSS WORKLOADS SIGNALS TO REMEDIATE PASSWORD SPRAYING ATTACKS

BACKGROUND

Background and Relevant Art

Computers and computing systems have affected nearly every aspect of modern living. Computers are generally involved in work, recreation, healthcare, transportation, entertainment, household management, etc.

Adversaries can often attempt to compromise computing resources by obtaining a password to the resources. There are numerous different ways to obtain passwords including phishing attacks, using key loggers, credential stuffing using previously stolen passwords and/or usernames, using premises access discovery whereby a password is obtained from a location where it has been written in plain text, brute force attacks, or password spraying attacks.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for detecting password spray attacks. The method includes obtaining information from an on-machine malware detection application for a particular machine indicating that a password spray tool is detected on the particular machine. Information is obtained indicating that the particular machine has performed failed sign in attempts. As a result, a determination is made that the particular machine is performing password spray attacks.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates a method of detecting password spray attacks; and

DETAILED DESCRIPTION

Figure 1:
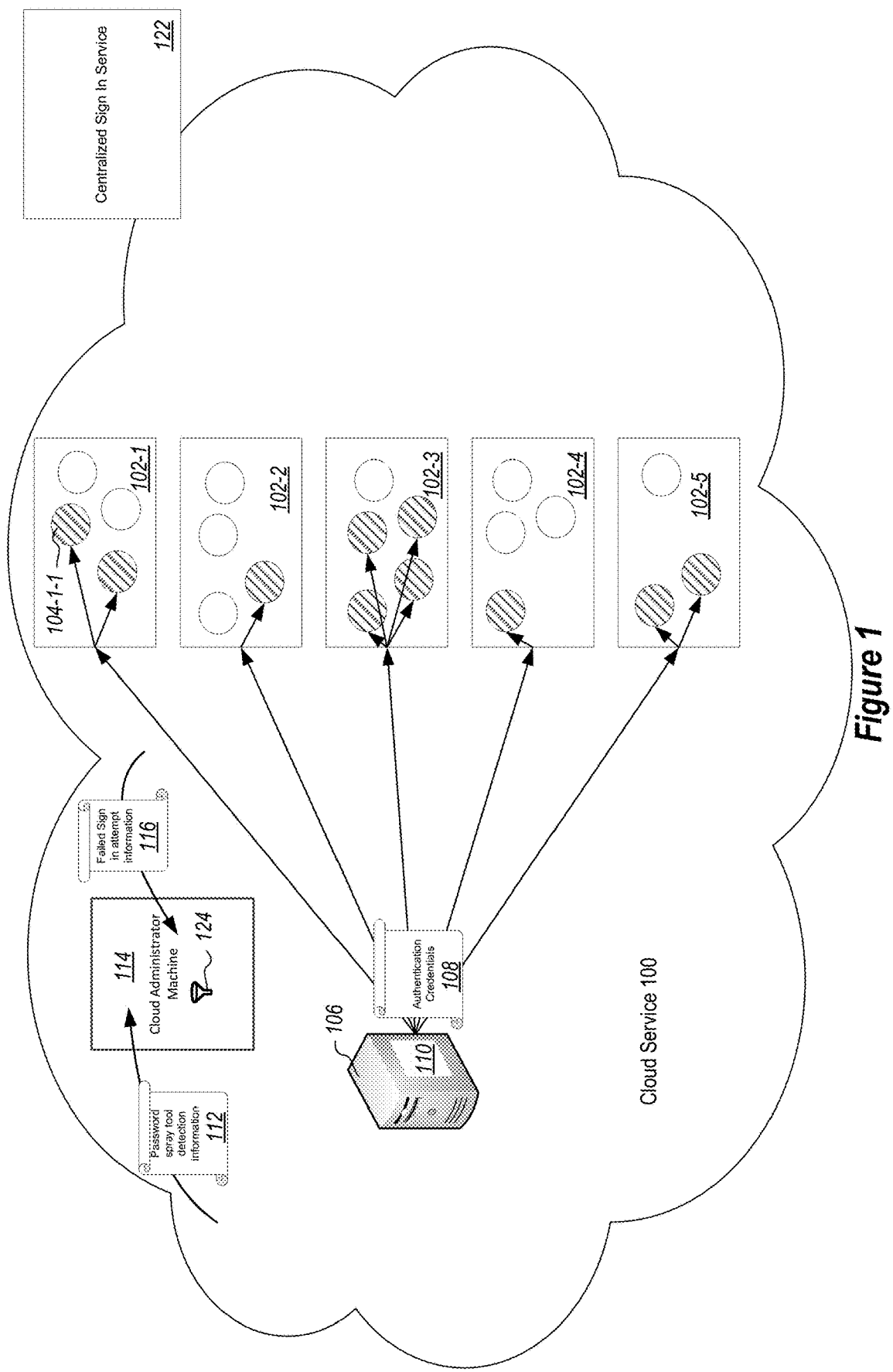
FIG. 1 illustrates a cloud service where a machine in the cloud service is performing password spray attacks.

Interconnection of computing systems has facilitated distributed computing systems, such as so-called "cloud" computing systems. In this description, a "cloud service" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud computing services and relating systems and resources can oftentimes be targets of attacks. Two general categories of attacks exist. In the first category, attacks are performed using knowledge about existing or previous passwords. That is, carelessness, social engineering, insufficient remediation of compromised passwords, and the like can be used to obtain known existing and valid passwords. The second category of attacks are essentially "guessing" attacks. That is, an attacker attempts to guess a valid password without previously having knowledge of an actual valid password. Two common guessing attacks are brute force attacks and password spraying attacks. One common type of brute force attack is a dictionary attack. In this type of attack, a single resource (such as a user account, computer system, or other resource) is attacked by iteratively using potential passwords from a dictionary of passwords to attempt to gain access. Thus, thousands or even millions of passwords may be tried for a particular single resource until access is ultimately gained.

In contrast, in a password spraying attack, a common password may be used to try and access multiple different computing resources in the hopes that at least one of those computing resources uses the password. Thus, while the brute force attack is focused on compromising a particular computing resource, a password spraying attack is focused on compromising any vulnerable computing resource from among multiple different computing resources.

As illustrated previously, guessing attacks may be performed to compromise computing resources. To perform guessing attacks, multiple authentication interactions are performed. Often, attackers will use previously compromised computing resources and/or cheaply obtained computing resources to effectuate the attack. In particular, significant amounts of computing resources and computing power may be needed to successfully compromise even a small number of computing resources.

Note that using a single computing resource to perform a large number of authentication attempts can cause the single computing resource to be quickly identified as a compromised computing resource and/or a malicious computing resource. For example, consider the case of a brute force dictionary attack. Each time the single attacking computing resource attempts to authenticate to a target computing resource, the single attacking computing resource will provide an IP address along with the attempted credential. If a target computing resource or a monitoring computing resource identifies multiple attempts by a single IP address to authenticate to the target computing resource, the attacking computing resource can be identified quickly. Further authentication attempts can be blocked from IP addresses known to be attempting a brute force attack.

Thus, adversarial entities will often perform so-called "low and slow" attacks to prevent attacking computing resources from being discovered and disabled. That is, attacking resources will only attempt a few authentication attempts and/or a limited number of attempts over time. This creates a technical problem for identifying, at scale, such attackers without adversely affecting legitimate users whose computing resources may have been compromised. This is especially problematic in cloud-based environments. From the attacker perspective, disabling legitimate resources can adversely affect legitimate customers of the cloud service and damage the reputation of the cloud provider. From the perspective of other tenants on the cloud service, such attacks can result in compromised user accounts. Legitimate tenants and customers are those where the primary purpose of the tenant is not to perform malicious attacks, but rather to perform useful, legal computing activities generally complying with terms of service of the cloud service. A malicious tent is one whose primary purpose is to perform illegal activities, activities attacking others, and/or activities violating the terms of service of the cloud service.

Further, most detection schemes detect high-volumes of authentication attempts from a single machine because setting thresholds too low for detecting authentication attempts results in legitimate machines, not actually performing password spray attacks, being identified as attacking machines. When non-attacking machines of legitimate tenants are identified as performing password spray attacks, this hinders legitimate computing activities and harms the reputation of the cloud service provider.

As discussed previously, attackers will often attempt to use low or no cost resources. For example, attackers may obtain tenant accounts (which are accounts for the tenant as a whole as contrasted with user accounts, which are multiple accounts implemented in the tenant) on cloud service resource providers to use virtual machines for attacks. Often times, the attackers will create free tenant accounts having a limited number of features, or being available for only a limited trial period, on a cloud service to obtain virtual machine resources to perform attacks. This can be problematic for the cloud service provider for multiple different reasons. The cloud resource provider becomes unwittingly involved in unethical and/or illegal behavior. Further, if a cloud service provider becomes identified as an attacking entity, this can damage the reputation of the cloud service provider. Further still, attacks will often be performed on other tenants of the cloud service provider thus further damaging the reputation of the crowd service provider. Further still, attacker tenant accounts violate the terms of service of the cloud service provider.

Referring now to FIG. 1, a cloud service 100 is illustrated. For example, the cloud service 100 may be Azure cloud services available from Microsoft Corporation, of Redmond, Washington. The cloud service 100 includes several entities, which in this example are tenants 102-1, 102-2, 102-3, 102-4, and 102-5. Although five tenants are illustrated in this example, it should be appreciated that a typical cloud service will include thousands or even millions of different tenants on the cloud service. Thus, the tenants 102-1 through 102-5 are merely illustrative for the present example. In the example illustrated in FIG. 1, each of the tenants includes a number of user accounts. For example, FIG. 1 illustrates a user account 104-1-1 in the tenant 102-1. In the particular example illustrated in FIG. 1, the user accounts are illustrated by the circles in the various tenants 102-1 through 102-5. Note that while a limited number of user accounts are illustrated in the example in FIG. 1, it should be appreciated that an individual tenant may have hundreds or thousands of user accounts for the particular tenant.

In the example illustrated in FIG. 1, a machine 106 (which in this example is a virtual machine implemented on a tenant account of a tenant of the cloud service 100) is illustrated. In this example, the machine 106 is performing a password spray attack by sending authentication credentials 108 (such as usernames and/or passwords), using a malicious password spray tool 120 (see FIG. 4), to various user accounts in the tenants 102-1 through 102-5 to attempt to gain unauthorized access to computing resources. FIG. 1 illustrates the user accounts on which a password spray attack is being performed by illustrating the user accounts in a shaded fashion to distinguish the user accounts from other user accounts.

In the example illustrated in FIG. 1, the machine 106 is implemented as a virtual machine of the cloud service 100. That is, the machine 106 will use various physical compute, storage, and networking resources provided by the cloud service 100 to implement the machine 106. Note that while in this example, the machine 106 is implemented as a virtual machine as part of the cloud service 100, in other embodiments, machines may be implemented in different cloud services, as a physical standalone machine at an on premises site, or in other ways.

The machine 106 has a malware detection application 110. The malware detection application 110 is a software application running on the hardware of machine 106. The malware detection application 110 is configured to detect various malware and other tools running on the machine 106. In some examples, this can be done by identifying filenames, keywords, and/or file signatures associated with password spray tools. One example of such a malware detection application is Windows defender available from Microsoft Corporation, of Redmond, Washington.

The malware detection application 110 is configured to provide information regarding detected malware and harmful tools to a malware protection service. The malware protection service 118 (see FIG. 4) may be a service operated and maintained by the provider of the malware detection application 110. In particular, the malware detection application 110 can provide information regarding detected malware and harmful tools to the malware protection service 118 where the malware protection service 118 can then instruct the malware detection application 110 to perform corrective actions on the machine 106, such as alerting the user of the machine 106 that malware or other tools, including password spray attack tools have been detected. Alternatively, or additionally, the malware protection service 118 can aggregate information from various different machines to identify widespread attack vectors, morphing attack vectors, changes in attack vectors, etc.

The malware protection service 118 can provide information about detected password spray tools installed (such as the password spray tool 120 illustrated in FIG. 4) and/or active at the machine 106. In the example illustrated in FIG. 1, password spray tool detection information 112 is provided to a cloud administrator machine 114. While not shown in FIG. 1, the password spray tool detection information 112 may be provided to the administrator machine 114 from a malware protection service (such as the malware protection service 118 illustrated in FIG. 4), which obtains the information from the malware detection application 110 installed on the machine 106. Thus, the password spray tool detection information 112 can be provided directly or indirectly (including some transformations of the information) from the machine 106 to the cloud administrator machine 114. The password spray tool detection information provided to the cloud administrator machine may provide information sufficient to identify the machine 106, such as one or more of an IP address of the machine 106, a timestamp associated with the IP address, an indication of which password spray tool is present on the machine 106, a tenant subscription ID for the tenant hosting the machine 106, a tenant ID of the tenant hosting the machine, a machine GUID for the ID, or other information.

While previous systems and/or configurations may have considered having such information sufficient to disable the machine 106 when the machine is part of the cloud service 100, this can be problematic when the machine 106 is being used by a legitimate tenant of the cloud service 100 such that shutting down the machine 106 would disrupt a customer's legitimate workflow and/or cause reputational damage to the cloud service provider. Thus, embodiments illustrated herein perform additional checking to ensure that the machine 106 is actually being used for password spray attacks. Note that as discussed previously, adversarial entities often attempt to hide their use of compromised machines and/or low cost or no cost computing resources to effectuate the password spray attacks. Thus, some embodiments illustrated herein gather additional detection information to confirm that the machine 106 is being used for password spray attacks.

In particular, and in example illustrated in FIG. 1, the cloud administrator machine 114 obtains failed sign in attempt information 116. The failed sign in attempt information 116 identifies that the machine 106 has performed failed sign in attempts against a predetermined threshold number of tenants and a predetermined threshold number of user accounts of the cloud service 100. For example, in some embodiments, the threshold may be five tenants and 10 user accounts. This particular threshold has been shown to be particularly useful in detecting password spray attacks without excessive false positives. However, in other embodiments, the threshold may be below six tenants and/or below 11 user accounts. This is useful for attacks that are known to be even more low and slow than typical low and slow attacks. Still, in other embodiments, the threshold number of tenants may be a number equal to or less than 100 and the number of user accounts may be a number equal or less than 500. These thresholds are useful for detecting low and slow attacks by more ambitious attackers while even further reducing the chance of false positives. In some embodiments, no threshold is used, but rather embodiments detect both that failed sign in attempts are being performed and that a password spray tool has been detected on the machine 106.

In some embodiments, the source of the failed sign in attempt information 116 is a centralized sign in service, such as the centralized sign in service 122 illustrated in FIG. 1. For example, user account authentication attempts are often tracked by centralized services, such as single sign on (SSO) services. Often, sign in attempts are tracked in sign in logs at the centralized sign in service 122. For example, machines running a particular operating system, particular software applications requiring sign in authentication, accessing certain cloud services, etc. often communicate with, and use a centralized sign in service 122 for authentication. If an attempt is made to sign into a machine and/or a user account or other authentication attempt, typically that attempt includes credentials directed to a particular user account and an identifier (such as an IP address) identifying the machine making the attempt. Thus, in the example illustrated in FIG. 1, the authentication credentials 108 will include not only the credentials themselves but also be accompanied by a unique identifier, such as an IP address, of the machine 106. The IP address (and potentially a time stamp associated with the IP address indicating when the IP address was associated with the machine 106) and information about whether or not the authentication attempt was successful are available to the centralized sign in service 122. If a threshold number of unsuccessful authentication attempts have been performed by the machine 106, as indicated by the failed sign in attempt information 116, then a determination can be made by the cloud administrator machine 114 that the machine 106 is performing password spray attacks.

In some embodiments, the failed sign in attempt information 116 may include an indication of the actual number of tenants and user accounts that have been attacked in a password spray attack. In such embodiments, the cloud administrator machine 114 can then determine when a sufficient number of failed sign in attempts have been made by the machine 106. Alternatively, the centralized sign in service 122 may include logic for determining when a threshold number of failed sign in attempts have been performed by the machine 106 to indicate that the machine 106 is performing a password spray attack. In this embodiment, the centralized sign in service 122 can simply send an indication in the failed sign an attempt information 116 indicating to the cloud administrator machine 114 that the machine 106 is performing password spray attacks without specifically providing additional details about the password spray attacks. Note that the centralized sign in service 122 is often not included as part of the cloud service 100. However, if the centralized sign in service 122 is included in the cloud service, the centralized sign in service 122 may be able to provide information such as one or more of an IP address of the machine 106, a timestamp associated with the IP address, a tenant subscription ID for the tenant hosting the machine 106, a tenant ID of the tenant hosting the machine, a machine GUID for the ID, or other information In some embodiments, the cloud administrator machine 114 includes a filter 124. The filter 124 is a computer implemented mechanism that is configured to filter information from the failed sign an attempt information 116 to determine if the machine 106 belongs to a legitimate, but compromised, tenant of the cloud service or the machine belonging to a malicious tenant of the cloud service. Thus, the filter 124 may include the ability to filter information on certain parameters when determining actions to take by the cloud administrator machine 114 against the machine 106.

In some embodiments, the filter 124 is configured to filter based on a number of user accounts for the machine's tenant. If the machine 106 belongs to a tenant having a number of user accounts below a predetermined threshold, this is indicative of a malicious tenant and indicative that the machine's tenant is not a legitimate tenant of the cloud service 100. In this context, a malicious tenant is a tenant that has been created in the cloud service 100 specifically for purposes of performing malicious attacks. As discussed previously, an attacker may subscribe to the cloud service 100 with the intention of creating a tenant with a small number of user accounts and/or machines such that attacking resources can be implemented with little or no expense to the attacker.

In some embodiments, the filter 124 is configured to filter based on a type of subscription for the machine's tenant. For example, three types of tenant account that may exist on the cloud service 100 include partner accounts, student accounts, or free accounts. A partner account is typically a tenant account that is associated with a significant cost to the tenant subscriber. Indeed, in some embodiments, a partner account can be identified based on threshold costs to the subscriber tenant. These tenant accounts allow the subscriber tenant to purchase certain amounts of compute resources, storage resources, and/or network resources from the cloud service provider. Cost to the tenant subscriber is typically determined by the amount of compute, storage, and/or network resources desired from the cloud service 100. The filter 124 can be used to identify a tenant as a partner account and thus determine that the machine 106 is a compromised machine belonging to a legitimate tenant of the cloud service 100. Alternatively, if the machine 106 belongs to a student account and/or a free account, both of which represent limited or no cost to the tenant subscriber, a determination can be made at the filter 124 that the machine 106 belongs to a malicious tenant of the cloud service 100.

In some embodiments, the filter 124 may be configured to filter based on tenant name of the tenant for the machine 106. For example, in some embodiments, tenant names may be compared with a dictionary of known legitimate companies to help in determining if a machine belongs to a legitimate tenant or not.

In some embodiments, the filter 124 may be configured to filter based on creation information about the tenant for the machine 106. For example, if creation time information indicates that the tenant for the machine 106 was more recently created, the more likely the tenant for the machine 106 is to be a malicious tenant as opposed to a legitimate tenant. Specifically, in some embodiments filtering comprises filtering based on a creation time for the particular machine's tenant, where the more recent the creation time, the more likely the particular machine's tenant is to be a malicious tenant as compared to tenants created earlier in time to the creation time.

In some embodiments, when it is determined that the machine 106 is a malicious tenant of the cloud service 100, the machine 106 can then be disabled by the cloud service 100. For example, in some embodiments the cloud administrator machine 114 may disable the tenant of the machine 106 preventing further attacks by the machine 106. If it is determined that the machine 106 belongs to a legitimate tenant of the cloud service 100 but that the machine 106 is simply a compromised machine of the legitimate tenant, then a notification can be provided to the tenant to perform remedial actions on the machine 106 to prevent the machine 106 from being used for further password spray attacks, while allowing the machine 106 to continue operating. This allows the tenant to continue to use the machine 106 for legitimate purposes rather than simply disabling the machine 106 and thus potentially causing a negative impact on a legitimate tenant of the cloud service 100.

Note that in some embodiments a machine performing a password spray attack may not be part of the cloud service 100, but rather may be part of a different cloud service, an on premises network, a standalone machine configured for performing password spray attacks, or the like. An example of this is illustrated in FIG. 2, where the machine 106 is located outside of the cloud service 100.

Figure 2:
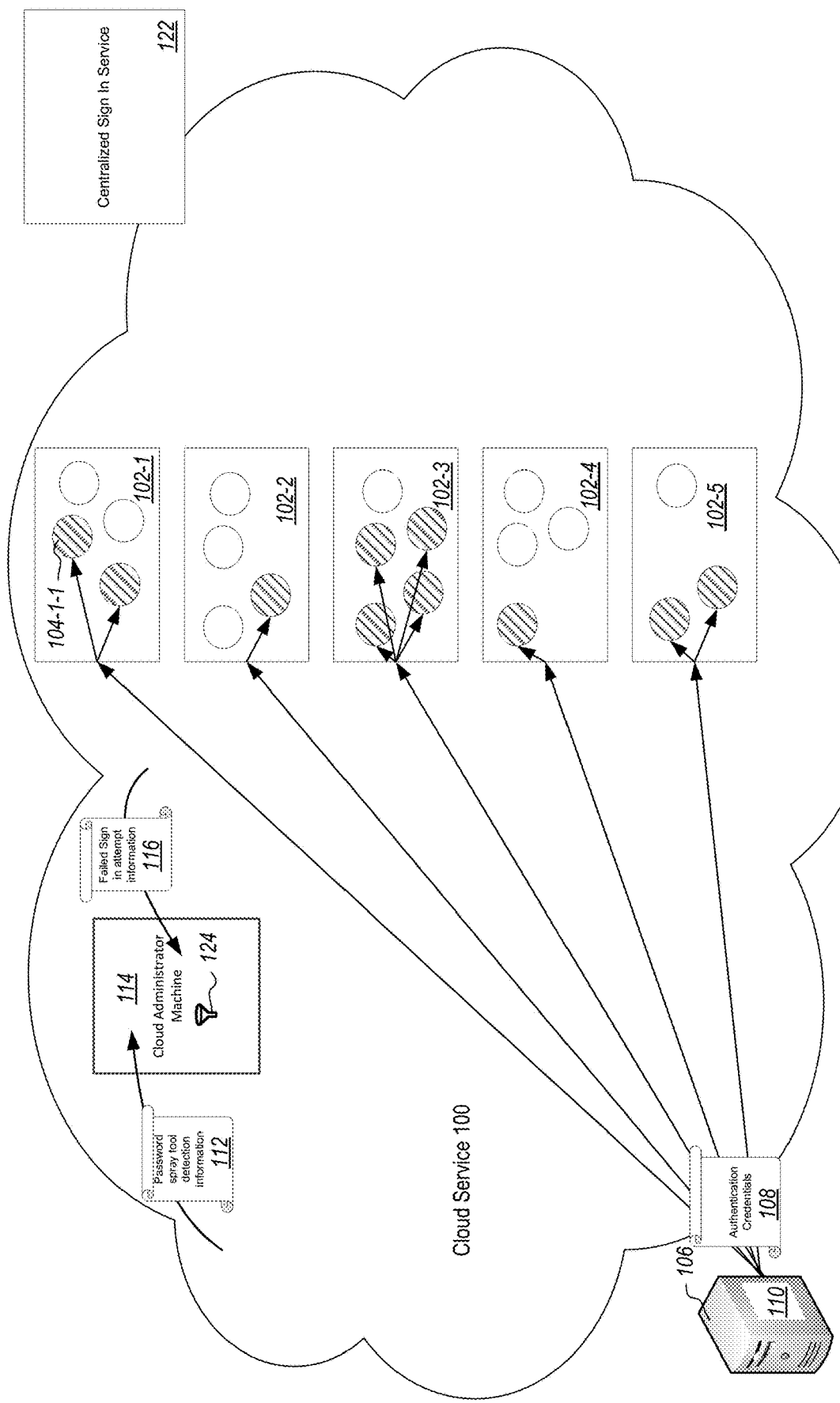
FIG. 2 illustrates a cloud service where a machine external to the cloud service is performing password spray attacks on user accounts of the cloud service.
Figure 5:
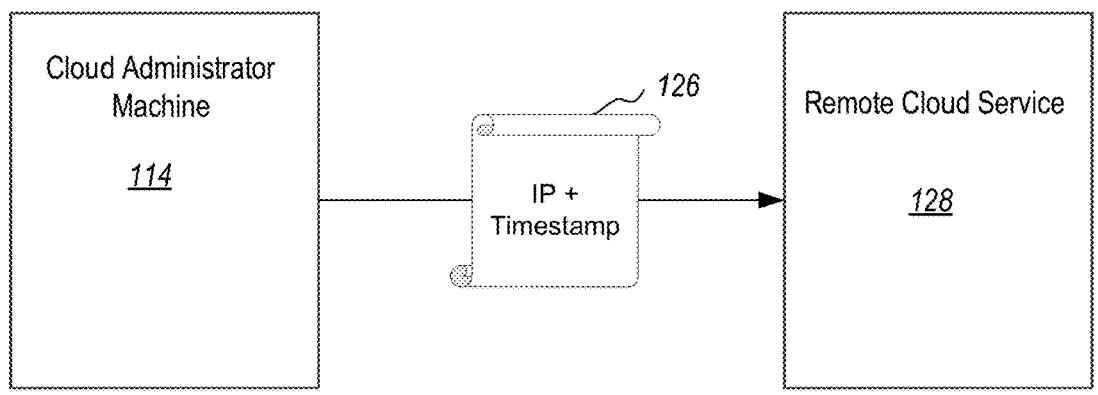
FIG. 5 illustrates an example of a cloud administrator machine providing identifying information about a machine to a remote cloud service.

Note that in FIG. 2, the centralized sign in service 122 will still be able to identify failed sign in attempts to the user accounts of the tenants of the cloud service 100, as the centralized sign in service is associated with user accounts, irrespective of where those user accounts are implemented. Further, failed sign an attempt information 116 can be provided to the cloud administrator machine 114 similar to what has been illustrated previously. Additionally, the machine 106 continues to have the malware detection application 110 installed such that password spray tool detection information 112 can ultimately be provided to the cloud administrator machine 114, such as through the malware protection service 118 as illustrated previously. However, one difference between the example illustrated in FIG. 2 from the example illustrated in FIG. 1 is that the cloud service 100 is not able to take direct action against the machine 106 and/or the machine's tenant. Nonetheless, the cloud service 100 can still take corrective actions. For example, in some embodiments, the cloud administrator machine 114 may determine that the machine 106 is a tenant of a different cloud service. In some embodiments, the cloud administrator machine 114 or other service at the cloud service 100 may notify the different cloud service that the machine 106 is performing password spray attacks. For example, as illustrated in FIG. 5, the cloud administrator machine 114 may send information 126, such as by sending an IP address and a timestamp, to a remote cloud service 128. The IP address and timestamp can be obtained from the centralized sign in service 122 as the authentication credentials 108 will be associated with the IP address in communications sent to the user accounts on which password spray attacks are being performed, and thus can be collected by the centralized sign in service 122. Additionally, the centralized sign in service 122 stores information indicating when failed sign in attempts are performed. Thus, information regarding an IP address and a timestamp can be provided by the cloud service 100 to the remote cloud service 128 allowing the remote cloud service 128 to take action against the machine 106.

Figure 3:
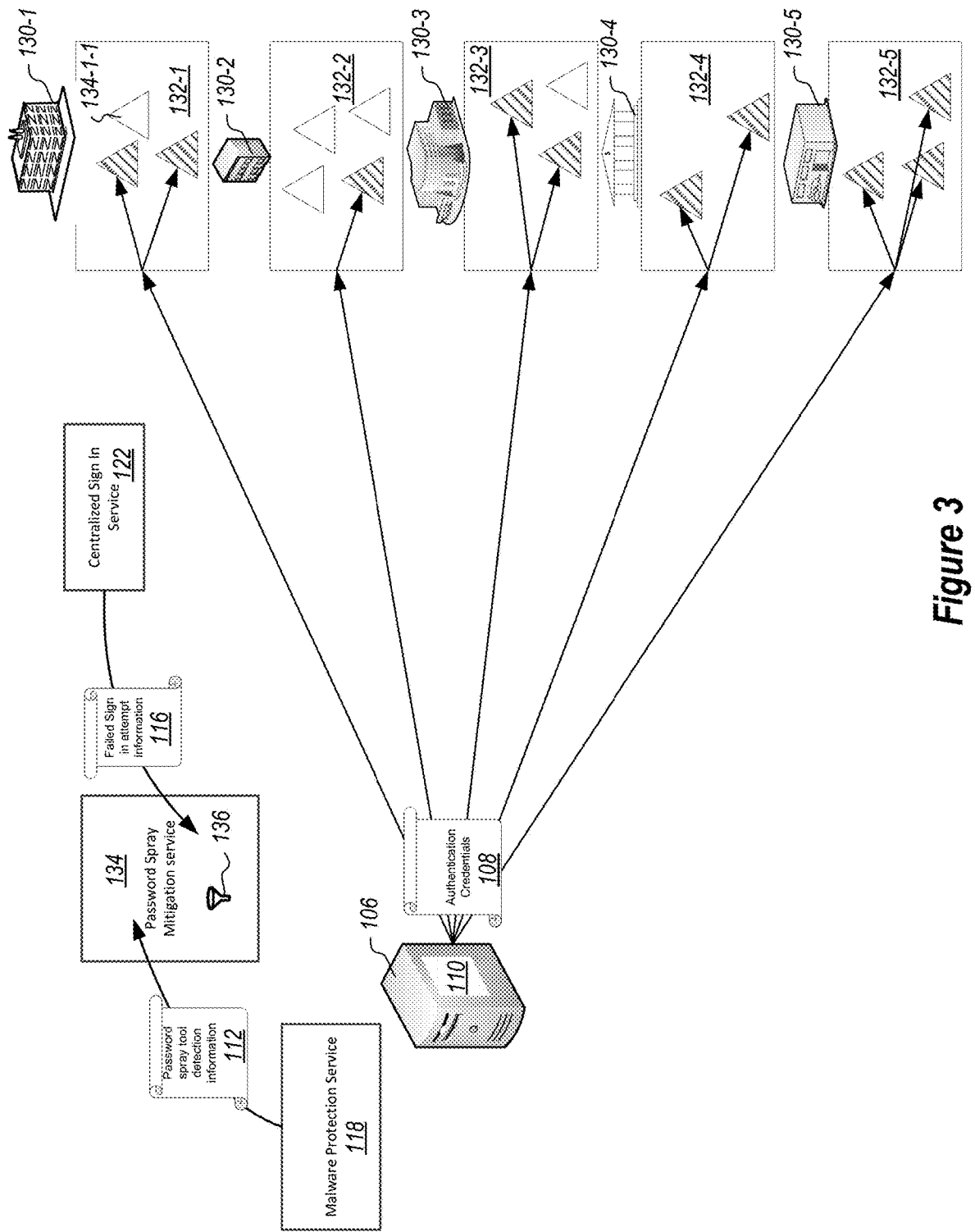
FIG. 3 illustrates an example of a machine performing password spray attacks on various entities.

Note that while the preceding examples have been illustrated in the context of a cloud service, other embodiments may be implemented in other environments. For example, FIG. 3 illustrates various entities having associated user accounts. For example, FIG. 3 illustrates five entities 130-1, 130-2, 130-3, 130-4, and 130-5. As with the previous examples, the number of the entities illustrated is not limiting of the number of entities that are applicable to a particular embodiment.

In the example illustrated in FIG. 3, each of the entities includes a corresponding IT infrastructure 132-1, 132-2, 132-3, 132-4, and 132-5, respectively. The IT infrastructure for each of the entities includes a plurality of user accounts such as user account 134-1-1, where other user accounts are further illustrated by the triangles illustrated in FIG. 3. Note that the user accounts illustrated in FIG. 3 may be included in on premises networks, on cloud services, and/or mixtures thereof. Thus, while the user accounts are illustrated locally with the entities 130-1 through 130-5, some user accounts may be on machines local to the entities while other user accounts are on machines remote from the entities.

Figure 4:
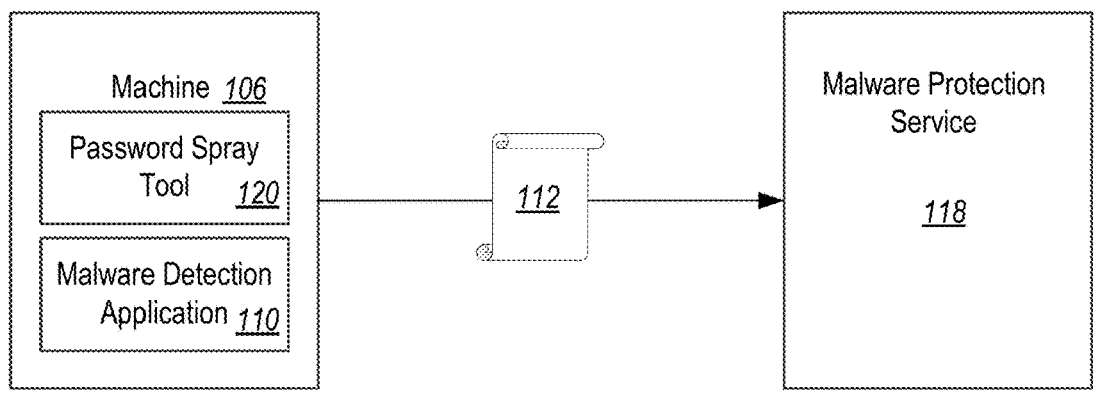
FIG. 4 illustrates an example of a machine providing password spray tool detection information from a malware detection application at the machine to a malware protection service.

As with previous examples, the machine 106 includes the malware detection application 110 which can report the presence of the password spray tool 120 to the malware protection service 118 as illustrated in FIG. 4, or directly to a password spray mitigation service 134 implemented on network connected computer hardware.

Further, the user accounts illustrated in FIG. 3 use the centralized sign in service 122 for authentication. Thus, when the machine 106 sends the authentication credentials 108 to the user accounts as illustrated in FIG. 3, the centralized sign in service 122 can identify failed sign in attempts as previously illustrated in the previous examples. Thus, the centralized sign in service 122 can provide the failed sign in information 116 to the password spray mitigation service 134. Similar to the previous examples, the password spray mitigation service 134 can use the password spray tool detection information 112 and the failed sign an attempt information 116 to determine that the machine 106 is performing password spray attacks.

Further, as illustrated in FIG. 3, password spray mitigation service 134 may include a filter 136. The filter 136 may include functionality for determining whether the machine 106 is a compromised machine, or a machine specifically implemented to perform password spray attacks.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 6, a method 600 is illustrated. The method 600 includes acts for detecting password spray attacks. The method 600 includes obtaining information from an on-machine malware detection application for a particular machine indicating that a password spray tool is detected on the particular machine (act 610).

The method 600 further includes obtaining information that the particular machine has performed failed sign in attempts (act 620).

The method 600 further includes, as a result, determining that the particular machine is performing password spray attacks (act 630).

In some embodiments, the method 600 may be practiced where obtaining information that the particular machine has performed failed sign in attempts comprises obtaining information that the particular machine has performed failed sign in attempts against a predetermined threshold number of entities and a predetermined threshold number of user accounts.

In some such embodiments, obtaining information that the particular machine has performed failed sign in attempts against the predetermined threshold number of entities and the predetermined threshold number of user accounts comprises obtaining information that the particular machine has performed failed sign in attempts against a predetermined threshold number of tenants and the predetermined threshold number of user accounts at a cloud service.

In some embodiments, the method 600 may further includes performing filtering for a tenant for the particular machine at a cloud service to determine if the particular machine is a compromised machine belonging to a legitimate tenant of the cloud service or a machine belonging to a malicious tenant of the cloud service.

In some such embodiments, filtering comprises filtering based on a number of user accounts for the tenant for the particular machine, where a number of user accounts below of a predetermined threshold is indicative of a malicious tenant.

Alternatively or additionally, filtering comprises filtering based on a creation time for the tenant for the particular machine, where the more recent the creation time, the more likely the tenant for the particular machine is to be a malicious tenant as compared to tenants created earlier in time to the creation time.

Alternatively or additionally, filtering comprises filtering based on a type of subscription for the tenant for the particular machine.

Alternatively or additionally, methods may further include determining that the tenant for the particular machine is a malicious tenant of the cloud service, and as a result, disabling the tenant for the particular machine.

The method 600 may be practiced where the predetermined threshold number of entities is at least 5 and the predetermined threshold number of user accounts is at least 10.

The method 600 may further include determining that the particular machine is a tenant of a remote cloud service; and notifying the remote cloud service that the machine is performing password spray attacks. An example of this is illustrated in FIG. 5.

The method 600 may further include reporting the particular machine to a centralized cyber response entity. For example, the machine may be reported to Microsoft Cyber Defense Operations Center. Alternatively, the particular machine may be reported to a centralized threat intelligence library. In this example, indicators directed to files, machines, subscriptions, and/or tenants can be reported such that these indicators can be used to automatically detect threat actors.

The method 600 may further include identifying a plurality of machines using a particular password spray tool and identifying patterns of attack for the particular password spray tool to fingerprint password spray tools. This information can be used in developing or improving detection and mitigation tools.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Example Computer/Computer Systems

Figure 7:
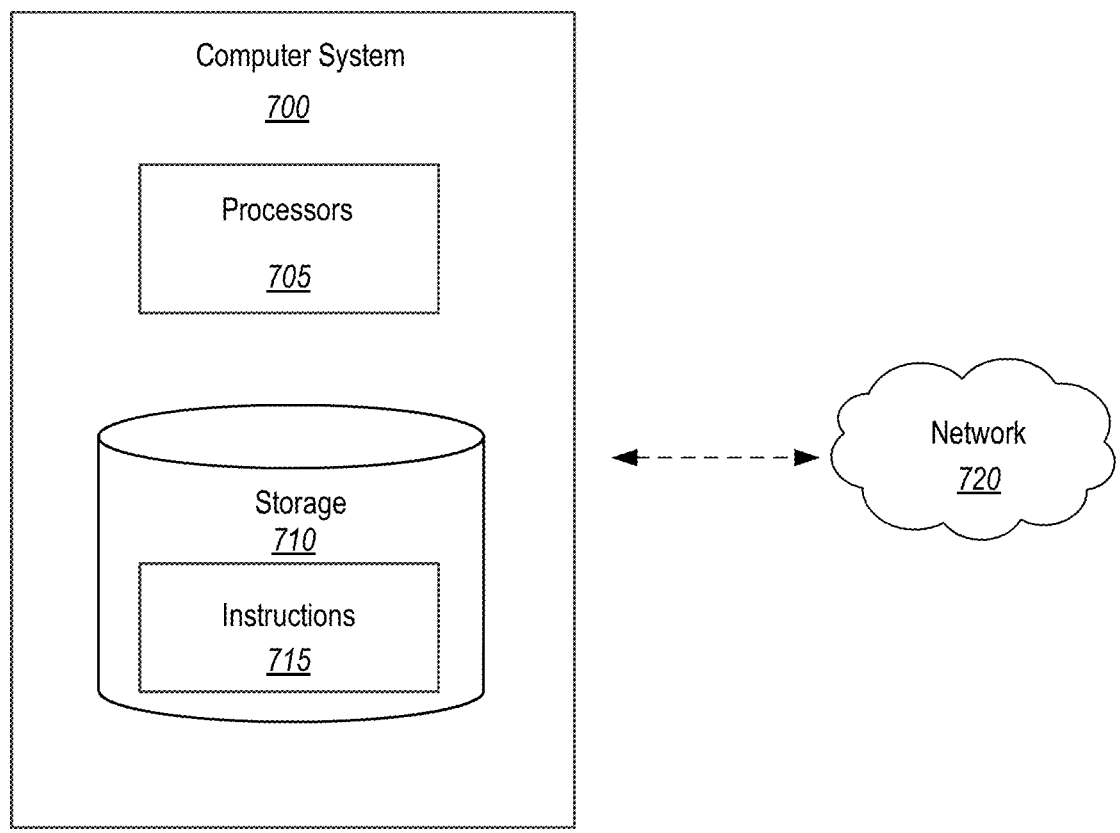
FIG. 7 illustrates an example computer system that can be configured to perform any of the disclosed operations.

Attention will now be directed to FIG. 7 which illustrates an example computer system 700 that may include and/or be used to perform any of the operations described herein. Computer system 700 may take various different forms. For example, computer system 700 may be embodied as a tablet, a desktop, a laptop, a mobile device, or a standalone device, such as those described throughout this disclosure. Computer system 700 may also be a distributed system that includes one or more connected computing components/devices that are in communication with computer system 700.

In its most basic configuration, computer system 700 includes various different components. FIG. 7 shows that computer system 700 includes one or more processor(s) 705 (aka a "hardware processing unit") and storage 710.

Regarding the processor(s) 705, it will be appreciated that the functionality described herein can be performed, at least in part, by one or more hardware logic components (e.g., the processor(s) 705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 700. The different components, modules, engines, and services described herein may be implemented as objects or processors that execute on computer system 700 (e.g. as separate threads).

Storage 710 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage 710 is shown as including executable instructions 715. The executable instructions 715 represent instructions that are executable by the processor(s) 705 of computer system 700 to perform the disclosed operations, such as those described in the various methods.

The disclosed embodiments may comprise or utilize a special-purpose or general-purpose computer including computer hardware, such as, for example, one or more processors (such as processor(s) 705) and system memory (such as storage 710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 720. For example, computer system 700 can communicate with any number devices or cloud services to obtain or process data. In some cases, network 720 may itself be a cloud network. Furthermore, computer system 700 may also be connected through one or more wired or wireless networks to remote/separate computer systems(s) that are configured to perform any of the processing described with regard to computer system 700.

A "network," like network 720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of detecting password spray attacks, the method comprising:
    obtaining information from an on-machine malware detection application for a particular machine indicating that the malware detection application has detected a malicious password spray tool on the particular machine;
    obtaining information that the particular machine has performed failed sign in attempts;
    determining that the particular machine is performing password spray attacks by identifying that the malicious password spray tool is detected on the particular machine and identifying that the particular machine has performed failed sign in attempts; and
    determining that the particular machine is a tenant of a remote cloud service; and
    notifying the remote cloud service that the particular machine is performing password spray attacks.

2. The method of claim 1, wherein obtaining information that the particular machine has performed failed sign in attempts comprises obtaining information that the particular machine has performed failed sign in attempts against a predetermined threshold number of entities and a predetermined threshold number of user accounts.

3. The method of claim 2, wherein obtaining information that the particular machine has performed failed sign in attempts against the predetermined threshold number of entities and the predetermined threshold number of user accounts comprises obtaining information that the particular machine has performed failed sign in attempts against a predetermined threshold number of tenants and the predetermined threshold number of user accounts at the remote cloud service.

4. The method of claim 3, wherein the predetermined threshold number of entities is at least 5 and the predetermined threshold number of user accounts is at least 10.

5. The method of claim 1, further comprising performing filtering for a particular tenant for the particular machine at the remote cloud service to determine whether the particular machine is a compromised machine belonging to a legitimate tenant of the remote cloud service or a machine belonging to a malicious tenant of the remote cloud service.

6. The method of claim 5, wherein filtering comprises filtering based on a number of user accounts for the particular tenant for the particular machine, where a number of user accounts below a predetermined threshold is indicative of a malicious tenant.

7. The method of claim 5, wherein filtering comprises filtering based on a creation time for the particular tenant for the particular machine.

8. The method of claim 5, wherein filtering comprises filtering based on a type of subscription for the particular tenant for the particular machine.

9. The method of claim 5, further comprising, as a result of determining that the particular tenant for the particular machine is a malicious tenant of the remote cloud service, disabling the particular tenant for the particular machine.

10. The method of claim 1, further comprising reporting the particular machine to a centralized cyber response entity.

11. The method of claim 1, further comprising:
    identifying a plurality of machines using a particular password spray tool; and
    identifying patterns of attack for the particular password spray tool to fingerprint password spray tools.

12. A cloud service system for detecting password spray attacks, the system comprising:
    the system hosting a plurality of tenants comprising a plurality of user accounts;
    a particular virtual machine having a malicious password spray tool and a malware detection application running thereon, wherein the malicious password spray tool is configured to perform password spray attacks against one or more user accounts in the plurality of user accounts;
    a cloud administrator machine configured to obtain information from the malware detection application indicating that the malicious password spray tool is running on the particular virtual machine and configured to obtain failed sign in attempt information about failed sign in attempts by the particular virtual machine, and as a result to determine that the particular virtual machine is performing password spray attacks; and
    wherein the cloud administrator machine is configured to determine that the particular virtual machine is performing password spray attacks when a password spray tool is detected on the particular virtual machine and when the particular virtual machine has performed failed sign in attempts against a predetermined threshold number of tenants and a predetermined threshold number of user accounts at the cloud service system.

13. The cloud service system of claim 12, wherein the cloud administrator machine is configured to be coupled to a malware protection service for obtaining information regarding the malicious password spray tool running on the particular virtual machine.

14. The cloud service system of claim 12, wherein the cloud administrator machine is configured to be coupled to a centralized sign in service for obtaining information regarding failed sign in attempts for the particular virtual machine.

15. The cloud service system of claim 12, wherein the predetermined threshold number of tenants is less than six and the predetermined threshold number of user accounts is less than 11.

16. The cloud service system of claim 12, wherein the cloud administrator machine comprises a filter configured for use in determining whether the particular virtual machine belongs to a legitimate tenant of the cloud service system.

17. The cloud service system of claim 16, wherein the filter is configured to filter on at least one of number of user accounts for a tenant hosting the particular virtual machine, a creation time for the tenant hosting the particular virtual machine, a subscription type for the tenant hosting the particular virtual machine, or a name of the tenant hosting the particular virtual machine.

18. One or more physical computer readable storage media comprising computer executable instructions that when executed by one or more processors configure the one or more processors to perform the following:
    a malware detection application identifying that a malicious password spray tool is detected on a particular machine;

identifying that the particular machine has performed failed sign in attempts;

determining that the particular machine is performing password spray attacks by identifying that the malicious password spray tool is detected on the particular machine and identifying that the particular machine has performed failed sign in attempts;

determining that the particular machine is a tenant of a remote cloud service; and notifying the remote cloud service that the particular machine is performing password spray attacks.

19. The one or more physical computer readable storage media of claim 18, wherein identifying that the particular machine has performed failed sign in attempts comprises obtaining information that the particular machine has performed failed sign in attempts against a predetermined threshold number of entities and a predetermined threshold number of user accounts.

20. The one or more physical computer readable storage media of claim 19, wherein identifying that the particular machine has performed failed sign in attempts against the predetermined threshold number of entities and the predetermined threshold number of user accounts comprises obtaining information that the particular machine has performed failed sign in attempts against a predetermined threshold number of tenants and the predetermined threshold number of user accounts at the remote cloud service.

* * * * *